United States Patent
Smyros et al.

(10) Patent No.: US 9,842,104 B2
(45) Date of Patent: *Dec. 12, 2017

(54) TEXTUAL GEOGRAPHIC LOCATION PROCESSING

(71) Applicant: Intelligent Language, LLC, Richardson, TX (US)

(72) Inventors: Athena A. Smyros, Richardson, TX (US); Constantine J. Smyros, Richardson, TX (US)

(73) Assignee: Intelligent Language, LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,003

(22) Filed: Nov. 14, 2016

(65) Prior Publication Data
US 2017/0060838 A1    Mar. 2, 2017

Related U.S. Application Data

(63) Continuation of application No. 14/465,266, filed on Aug. 21, 2014, now Pat. No. 9,495,359.

(60) Provisional application No. 61/868,093, filed on Aug. 21, 2013.

(51) Int. Cl.
*G06F 17/27* (2006.01)
*G10L 25/00* (2013.01)
*G06Q 10/00* (2012.01)
*G01C 21/34* (2006.01)

(52) U.S. Cl.
CPC ....... *G06F 17/278* (2013.01); *G01C 21/3446* (2013.01); *G06F 17/274* (2013.01); *G06Q 10/00* (2013.01); *G06F 17/2795* (2013.01)

(58) Field of Classification Search
CPC ...... G06F 17/28; G06F 17/2785; G06F 3/167; G06F 17/27; G06F 17/2735; G06F 17/274; G06F 17/278; G06F 17/30654; G06F 17/30684; G06F 17/30976; G06F 3/1367; G06F 3/0842; G06F 3/0484; G06F 3/04842; G10L 15/22; G10L 17/22; G10L 2015/223; G10L 15/30; G10L 15/00; G10L 15/1815; G10L 15/1822; G10L 2015/30; G10L 2015/1815; G10L 2015/1822; G10L 17/274
USPC .............................. 704/9, 10, 235, 246, 275
See application file for complete search history.

(56) References Cited

U.S. PATENT DOCUMENTS

| | | |
|---|---|---|
| 235,694 A | 12/1880 | Metcalf |
| 6,381,465 B1 | 4/2002 | Chern et al. |
| 7,200,559 B2 | 4/2007 | Wang |
| 7,921,108 B2 | 4/2011 | Wang et al. |
| 8,015,196 B2 | 9/2011 | Taranenko et al. |
| 8,041,730 B1 * | 10/2011 | Upstill .............. G06F 17/30241 707/706 |
| 8,145,703 B2 | 3/2012 | Frishert et al. |
| 8,239,129 B2 | 8/2012 | Shen et al. |
| 8,326,866 B1 * | 12/2012 | Upstill .............. G06F 17/30241 707/706 |

(Continued)

*Primary Examiner* — Edgar Guerra-Erazo
(74) *Attorney, Agent, or Firm* — Slater Matsil, LLP

(57) ABSTRACT

Textual Geographical Location relates a placename, which is a set of terms, from one to any maximum as defined in an individual language, to a unique point or area (many points) as found on a map or other coordinate system, such as the map of the United States as used in global positioning system (GPS).

3 Claims, 2 Drawing Sheets

(56) References Cited

U.S. PATENT DOCUMENTS

| | | | |
|---|---|---|---|
| 8,332,396 B1 * | 12/2012 | Srinivasaiah | G06Q 30/02 707/723 |
| 8,417,721 B1 * | 4/2013 | Upstill | G06F 17/30241 707/706 |
| 8,484,188 B1 * | 7/2013 | Upstill | G06F 17/30241 707/706 |
| 8,510,032 B2 | 8/2013 | Shen et al. | |
| 8,527,538 B1 * | 9/2013 | Upstill | G06F 17/30241 707/706 |
| 8,583,365 B2 | 11/2013 | Jang et al. | |
| 8,589,780 B2 * | 11/2013 | Chen | G09B 29/106 715/202 |
| 8,650,024 B1 * | 2/2014 | Snellman | G06F 17/2276 382/113 |
| 8,880,397 B2 | 11/2014 | Almaer et al. | |
| 2003/0007609 A1 | 1/2003 | Yuen et al. | |
| 2003/0069991 A1 | 4/2003 | Brescia | |
| 2003/0125869 A1 | 7/2003 | Adams, Jr. | |
| 2004/0122810 A1 | 6/2004 | Mayer | |
| 2005/0192809 A1 | 9/2005 | Dodrill et al. | |
| 2006/0036592 A1 | 2/2006 | Das et al. | |
| 2006/0235694 A1 | 10/2006 | Cross et al. | |
| 2008/0133124 A1 | 6/2008 | Sarkeshik | |
| 2012/0271624 A1 * | 10/2012 | Chen | G09B 29/106 704/9 |
| 2014/0324431 A1 | 10/2014 | Teasley | |

\* cited by examiner

TEXTUAL GEOGRAPHIC LOCATION PROCESSING

RELATED APPLICATIONS

This application is a continuation application of U.S. patent application Ser. No. 14/465,266, entitled "TEXTUAL GEOGRAPHICAL LOCATION PROCESSING," filed Aug. 21, 2014, which claims priority from Provisional Application No. 61/868,093, "TEXTUAL GEOGRAPHICAL LOCATION PROCESSING", filed Aug. 21, 2013, which applications are hereby incorporated herein by reference in their entirety.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

Textual Geographical Location relates a placename, which is a set of terms, from one to any maximum as defined in an individual language, to a unique point or area (many points) as found on a map or other coordinate system, such as the map of the United States as used in global positioning system (GPS). A location or an area may have any number of placenames, and some locations may have more than one placename associated with it. Each location is based on a coordinate system which orders its space into a particular order; for example, a geographical order that indicates the outline of the states that comprise the United States. Any coordinate system can be used with any type of location, and it may also be used to locate on a map by using a set of coordinates, such as a global positioning system (GPS) that indicates the location of the city of, for example, Dallas. Any set of coordinates involves a method for determining the underlying geometry with a precision associated with it, which means, for instance, that a 2D GPS and a 3D GPS system can have the same placename with different coordinates. Placenames normally have shortened forms, abbreviations, or may be described by one or more larger areas, such as when a city is in a county, and that county is in a state in the US. Textual geographical location is a bidirectional system, so that placenames can be related to and from a coordinate system. The system can be used for searching, information retrieval, information analysis, and other location tasks, and may be located on a mobile device or handheld device or may be on any other kind of computer or device, including networked computers. Depending on storage requirements, the entire invention can also exist on a mobile or embedded device.

Figure 1:
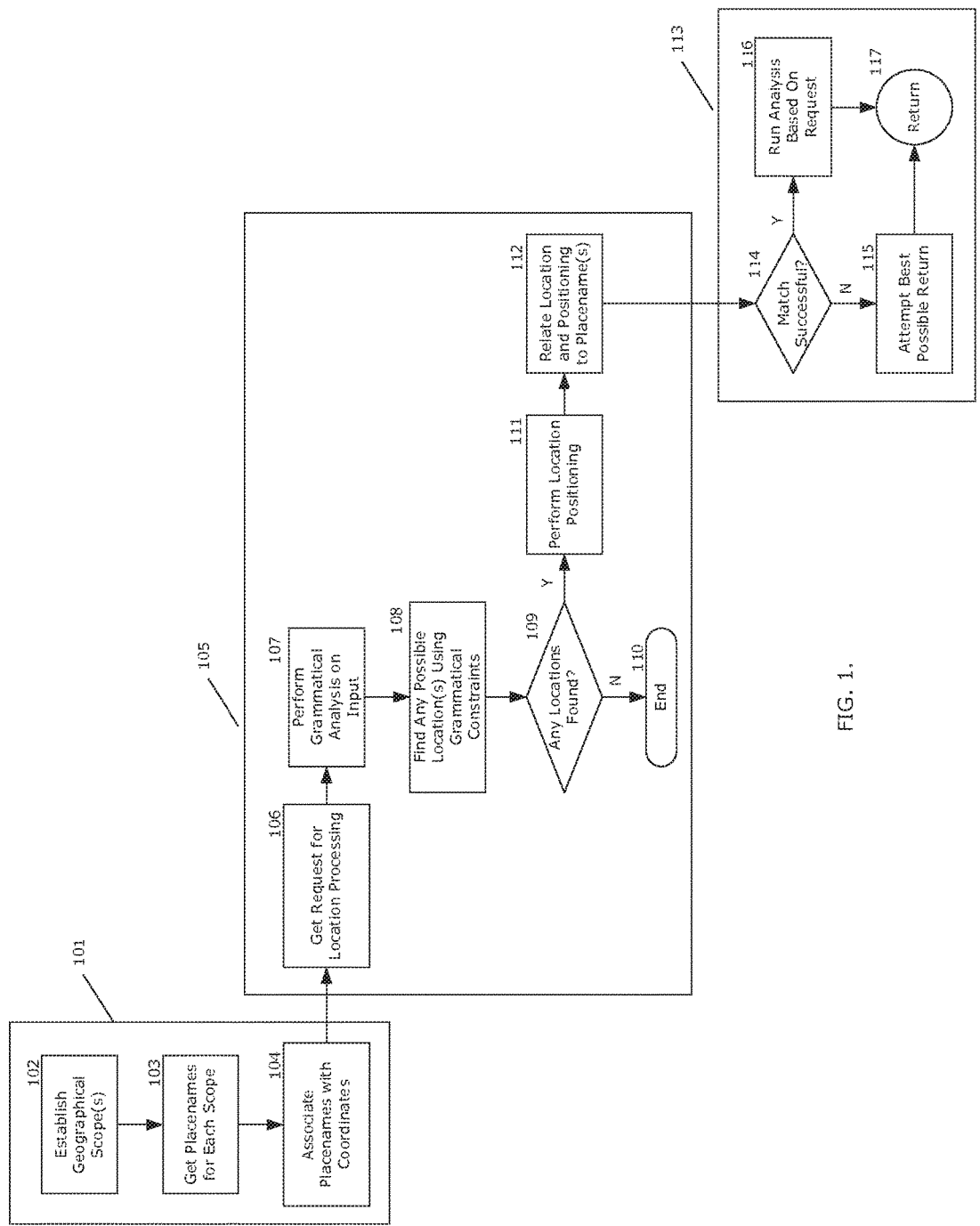
FIG. 1 illustrates an example of the Textual Geographical Location Processing that is usable with the embodiments described herein.

Analyzing locations is comprised of 3 phases, and this is shown in FIG. 1. The first is the builder phase 101. This phase takes the area that is to be used by the system (such as a geographical area like Texas) and gets the placenames and coordinates that are used within that area. The second phase is the association phase 105. This matches placename(s) to a specific area; note that this is reversible so that the area can also be matched to a placename. The final phase is the analysis phase 113. This relates at least one placename and its associated coordinates to at least one other placename with its associated coordinates; or it could be that a coordinate maps to several placenames. It can also be used with other indicators, such as ordinal directions (north, south, east, west). Other analysis using this information is also done during this phase, including determining objects that reside within a specific location.

The first phase is a data store building phase, and has several different labeling methods that can be used—some with fuzzy aspects. These cause an interplay between the region and the labels. The preliminary setup is first required by establishing the geographical scopes that the system must support 102; this varies based on implementation. Once this has been established, the list of placenames for each scope are identified 103. This entails setting up a data store so it can support changes to the system. This data store may contain multiple entries for a placename as required for a particular implementation; other implementations may employ other subsystems to handle similarity problems. The list of placenames, may have a standard name and other names that are used by local, such as "Big D" for "Dallas". These lists may need to be built over a period of time and may require equivalence logic in order to determine if one expression is equal to or refers to a part of another, such as "North Dallas" or "Far North Dallas". The use of grammatical analysis is key to ascertain relations that are not expressed in a list format, and would be dependent on the amount of data available in the repository to determine such relations. Preferably, this also puts both the input and a repository using the invention in the same format, making comparisons and other information retrieval and analysis methods more efficient.

There is significant repetition with placenames; some places have the same name but are in a different and larger geographical region. In order to effectively store this information, a use of the Windex, as shown in "SYSTEMS AND METHODS FOR INDEXING INFORMATION FOR A SEARCH ENGINE", U.S. application Ser. No. 12/192,794, filed 15 Aug. 2008, the disclosure of which is hereby incorporated herein by reference in its entirety, called the L-Windex may be optionally maintained. Names like city, lake, and surnames are very common and may be used outside of a specific location as well as being part of a particular placename. These can be used to both condense the index for placenames as well as to indicate common placename terms that generally indicate some type of geographical area. This may be separate from any other store or may also be linked to a regular Windex store for a given repository. The separation of storage between location and other terms is done because there are several instances of where a placename has multiple terms and each term has a meaning on its own or indicates membership into another set. For instance, the term "Dallas" is used in Dallas County, City of Dallas, Dallas Texas, North Dallas, Far North Dallas, etc. These are related terms; also it serves to indicate the number of times a term is used within a particular coordinate system. This is true of "Dallas Iowa", which is not equal to Dallas Texas and by separating the terms into constituent parts, "Dallas", "Texas", and "Iowa" can be analyzed separately and recognized as separate entities.

Depending on the type of tasks that an implementation needs to perform, an association between a coordinate system 104, such as a GPS and the individual placenames from 102 can be optionally performed. This allows certain problems to be solved involving mapping, such as finding a restaurant within a certain geographical region. The data store comprises at a minimum the coordinate that references a particular placename that represents a point or set of points in the coordinate system or GPS. For instance, if the placename equals 1234 main street, there should be at least one coordinate or set of coordinates that refers to this street. Note that regions, or where the street is located in a major area is important, such as a town, since there are different coordinates that can match the same street address. Depending on the scope, it is possible to partition the data store in regions, such as a town or city that can be mapped in the coordinate system, so that ranges can be isolated. However, depending on the amount of analysis to be performed, it may not be necessary to store this information as it can be obtained from a system that listed all coordinates for the placename 1234 main street and then listed all coordinates for the placenames Dallas, Houston, and Atlanta, for example, that contained that first placename.

The data store creation process has produced the data stores in a usable order to handle the association phase 105. Once the system has the appropriate data store in place, it is ready to service requests for location processing 106. A request may be in any textual form: a file, a document, a message, a search term, or any other finite text stream; or may be converted from another form into a text stream for use with the system. The request may also be a sentence, paragraph, or any part of a text stream that may or may not be written to include location information; there is no limitation on the type of text or subject matter.

The request for location processing may also contain other information that needs to be analyzed that can be done at the same time with the location analysis. A request may only contain placenames or may be a stream of text that contains a lot more information than just geographical locations. The request may also indicate what type of location analysis it might require, such as determining a range of locations that are responsive to a search term, such as "restaurants in the Dallas area". The system request does not have to assume that a placename is found in the request or which term is a placename. This is a common problem in analyzing text streams for locations since the focus of the writer or author of the text may not be an analyst looking for locations of objects.

Once the request and the information required to service that request has been obtained from the system, it may choose to perform grammatical analysis on the textual input 107, which is an optional step. It is possible that such analysis is not required, and that it is known at input, or it may be that a predicate to the grammar analysis be done in order to determine what is required to process the input. For instance, if a text input comprises a string, the string should be broken down into appropriate term units (TUs) so that each word, number, symbol, etc. can be used by the system. This type of analysis is necessary when the location is not known at input time and needs to be analyzed. The grammar analysis can be comprised of a parser, an analyzer for semantical and syntactical functions, and other such tools that identify to the system what TU belongs to what kind of function in the sentence, such as a noun, verb, etc. The grammatical analysis is normally used when the request does not know or can assume that a placename is mentioned or where the placename is in the text. Depending on the language used, the output of the grammatical analysis includes object and modification of objects as presented in the text at a minimum, as well as verbs, adverbs, or other parts of speech that contribute to the understanding of location as necessary to analyze the input.

If grammatical analysis has been performed, then the possible locations can be found using grammatical constraints 108. At this point in the system only the possible locations are known; this is because several placenames may also be proper names of other objects, and this must be disambiguated. The first function is to determine if a proper name is being used, instead of a location. Each possible location would need to be tested for this. This, depending on the implementation, might be as simple as a basic list, more complex in determining if personal pronouns were used in substitution of the possible location, or still more complex in looking at the possible modifier lists of the possible location. For instance, if there is an input that is comprised of the following: "In Allen, there are several excellent restaurants and shopping venues". The use of the single term, Allen, is found to be a possible location. The sentence relates restaurants and venues to being in Allen, two things that are not associated with the internals of a person. This would mean that Allen is not being used as a proper name. Depending on the implementation, this would require that the sentence is fully grammatically analyzed, since the sentence requires the use of the verb "are" to be identified in order to make the association required to solve the problem.

In some inputs, there will be variation of expressions that equate to the same name. This will require that the grammatical constraint of an object is known. Then, the comparison between objects that might have the same value can be performed. In one case, using the above example. Allen could also be used in the input as "Allen, Texas", the "City of Allen", etc. Therefore, most implementations need to allow for variations in expressions to be grouped together and analyzed so that all such possible location information can be determined. For instance, it is possible to omit parts of a city name and still to be understood in context. Another example of this usage is New York City, which can have several similar values, such as New York, NYC, etc. that are not related to its function as a location but can be grouped together by a strictly grammatical process as objects, which allows other analysis to determine if NYC is a shortened form of New York City. This type of analysis results in the grouping within the input of various equivalent placenames.

This allows then the best possible set of data that can be used to match the locations found with the data store 109. A general method is outlined in U.S. application Ser. No. 13/402,775, entitled "SYSTEMS AND METHODS UTILIZING A SEARCH ENGINE", filed 22 Feb. 2012, the disclosure of which is hereby incorporated herein by reference in its entirety. This match occurs for each grouping of each unique set of terms found, or what were deemed to be locations if grammatical analysis is not used based on the input. If there is no match, then the process ends 110. The reason for matching groups is that there is less burden on storing all this information in a single data store; rather, the system can discover these as it goes along so the variations can be found first, and then matched. This means that a more accurate placename can be matched with a location. If there is even a basic similarity, more grammatical analysis may be done on these to indicate how similar or if there is a need to relate it to another piece of information during this process, depending on the implementation. If required, an optional step to complete the matching process can be done, called location positioning 111. This process can be done in various ways depending on how the data store was built. For example, if there is a coordinate that maps to a specific placename, such as 1234 main street, and another placename, Dallas, that maps to a range of placenames, then in-some cases, this type of analysis may be done on a grammatical level, where an input may contain "the Dallas store is located at 1234 main street", and because of the grammatical analysis, the placename 1234 main street can be positioned within a larger area, Dallas, even if the coordinate system doesn't contain information for one of the placenames. This type of location positioning is very useful for mapping and other operations that may require ranges as implied by a placename like Dallas to solve for the appropriate coordinate system indicated by the other placename 1234 main street.

Another form of the problem of recognizing a location comes from the fact that locations are not unique within a universe of discourse within a language such as English. Allen, for instance, can refer to a person's first name, last name, or a place in Texas, or a street name in Texas, a company name, etc. This kind of problem requires that the grammatical form of the request is known; for example, is it operating as an object in the request or as a modifier. In addition, contextualization information as collected from topical analysis and other forms of quantification, is normally required. For more on topical analysis please refer to "SYSTEMS AND METHODS FOR TOPICAL SEARCHING", U.S. application Ser. No. 12/192,846, filed 15 Aug. 2008, and published as Application No: 2010/0042589 on 18 Feb. 2010, the disclosure of which is hereby incorporated herein by reference in its entirety. For more on collection, please refer to "GRAMMAR TOOLS", U.S. patent application Ser. No. 13/027,256, filed 14 Feb. 2011, the disclosure of which is hereby incorporated herein by reference.

This is to determine the context that "Allen" is in, so that the town name can be discerned from the business name, since it is possible these may have some characteristics in common within an input. Someone can go into a business or go into a town. It is also possible that the name of the business may have a shortened form equal to the name of the town, and this is why topical analysis is important and can cause a refinement in the location position and trigger the need in some implementations for a more precise location position match.

At this point, it is possible then to perform an optional secondary location and position match again against the placenames 112 using a variety of information points. For instance, this match can be done purely on relating all found locations to each other by looking at what is possibly related based on the input, optionally using grammatical analysis such as the topical analysis to determine if the business has a separate input in a coordinate listing from the town, as in the case of Allen above, even though the two entities are related. This allows a fuller responsiveness from the coordinate system and does not require additional user feedback to make the determination of a more accurate GPS device return, for instance. This would allow automation of many tasks without human intervention so that robotics and other automated devices will be able to handle such inputs.

In another instance, if there are three placenames initially found to be responsive, but there is not enough information to determine where 1234 main street is located, then a GPS device cannot help a customer get to a specific business without relating the positioning to the locations, and then the locations to the placenames. This allows the system of the invention to adapt to less than ideal situations, particularly in documents that might leave information out because its initial audience knew where the location was, but now with new people potentially searching the document, this information is not available. Another facet of this matching is then based on looking at various places in the document where locations were initially related to placenames, but there may be more placenames that might be responsive to the input that require a secondary lookup. Therefore, a simple listing of the locations in the document, without being able to relate them, is of no use to a GPS device that needs to know what region or set of points are responsive to the input. If the match was not successful 114, then the system will attempt to report 115 to provide the best possible return what information it has about the location 112. For instance, if there is no information in the data store about a specific region that does not match a placename, like Dallas County, then it is possible to return information that was found in the data store, such as the GPS for Dallas.

Additional analysis 116 may be performed on this based on requests, such as showing what groups were found to be the same placename; what locations are related to another part of the input, such as a store or a business, or other entity; or showing more relations between locations. For instance, it may be possible to plot the path represented in an input or determine the extent of a map based on the locations provided in an input. If all the inputs are in the same geographical region, based on their approximate GPS coordinates, this information can be related, as well as distance between them and other such information. Another useful tool is the ability to determine a region, based on some distance radius, that is considered appropriate for a given range, such as a person not wanting to travel more than 20 miles to a job location or to go to a specific store. This information can be obtained and calculated from the coordinate(s) that relate to the location. Another lookup to the data store may be used to get all the possible placenames and locations that are within such a region. This may be returned 117 to the user or requesting system, or it may be used in conjunction with other information tasks to prevent a search from returning a company location outside of the user's preferred area.

Other types of analysis may be used to determine the relation between topics and other information quantification methods to specific locations. For instance, once an input has all of its locations found, and all positions of the locations are known, it is possible to go back to the topics that are found to contain those locations, and associate the locations to topics, as well as other objects found to be included within a topic or set of topics. A topic "dog" may be found to include the sentences "Most dogs prefer chew toys that are the color of meat according to The Pet Store in Murphy. The type of material that the chew toy is constructed of is less important than its color, but it cannot be too dissimilar from the sensation of biting into a steak. The dog may then reject the toy." The location is found to be "Murphy", and there is a pet store that has learned something above dog preferences. This may be contrasted to another location, where dogs perhaps didn't care what color the toy was, so long as it tasted like a steak. This analysis can be done without the user having to group together inputs or attempt to structure the data in any way. Any unstructured data can be used for this analysis, meaning the user doesn't need to know the data exists before he attempts the analysis.

This can be automated by launching such analysis as soon as a location or set of locations has been found, and determining what objects, topics, and other quantification information can be used to associate a location with such entities. For more on quantification, please refer to "QUANTIFICATION SYSTEMS AND METHODS", U.S. patent application Ser. No. 13/689,645, filed 29 Nov. 2012, the disclosure of which is hereby incorporated herein by reference.

Figure 2:
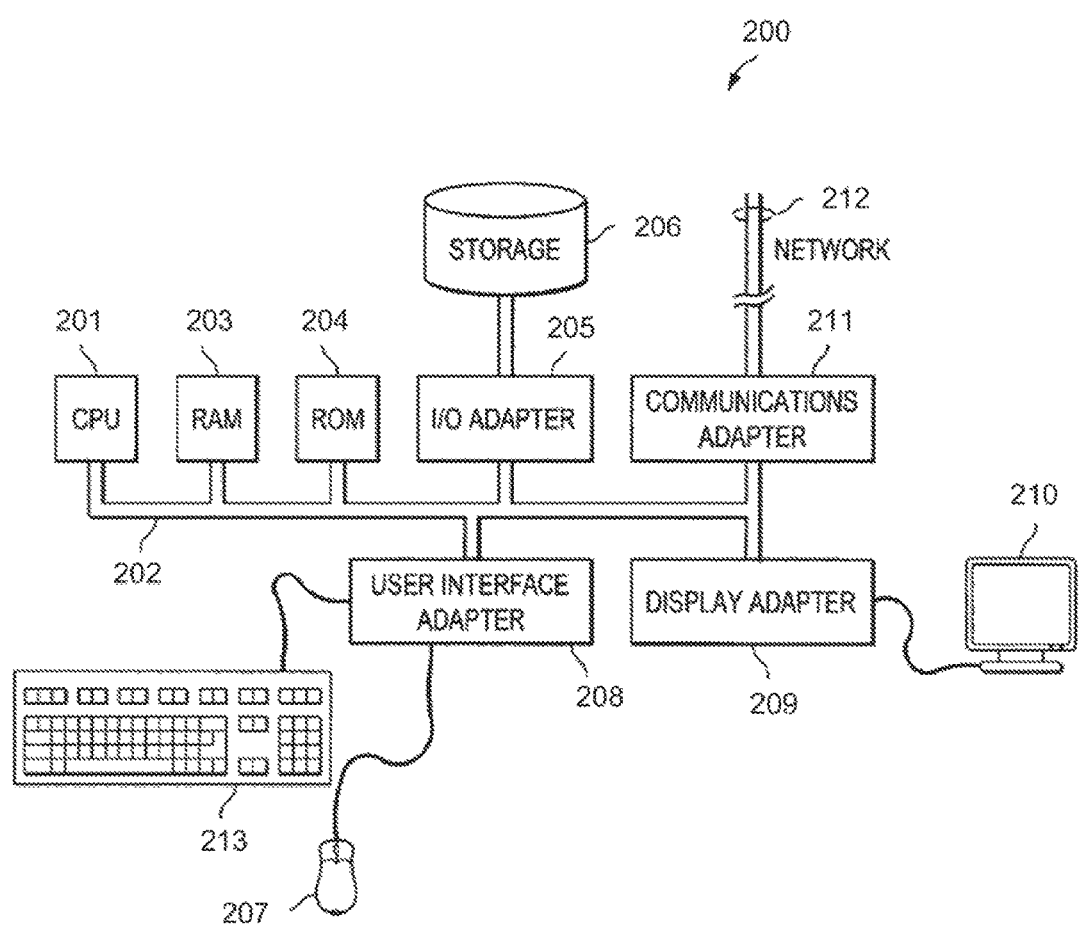
FIG. 2 illustrates a computer system that is usable with the embodiments described herein.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller 205, communications adapter 211, user interface 208, and display 209. The I/O adapter card 205 connects to storage devices 206, such as one or more of flash memory, a hard drive, a CD drive, a floppy disk drive, a tape drive, to the computer system. Communications 211 is adapted to couple the computer system 200 to a network 212, which may be one or more of a telephone network, a local (LAN) and/or a wide-area (WAN) network, an Ethernet network, and/or the Internet network. User interface 208 couples user input devices, such as keyboard 213, pointing device 207, to the computer system 200. The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium. The "computer readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

What is claimed is:

1. A computer program product stored on a non-transitory computer-readable medium having computer program logic recorded thereon for performing location positioning, he computer program product comprising:
    code, using deterministic grammatical analysis, for determining a geographical area associated with a document from text contained in the document, wherein the text includes a home for a person, and not using a GPS signal;
    code for determining at least one placename and coordinates for the one placename within the area;
    code for performing association between the placename and a specific area using deterministic grammatical analysis to determine at least one other placename, wherein the placename and the one other placename are geographic synonyms;
    code for performing analysis on the association to relate the placename to the one other placename and coordinates for the one other placename;
    code for comparing the placename and the other placename with a document repository, wherein the document repository contains job locations to determine which job locations are proximate to the placename and the other placename; and
    code for displaying the proximate job locations to the person.

2. The computer program product of claim 1, wherein the code for performing analysis includes using ordinal directions.

3. The computer program product of claim 1, wherein the code for performing includes means for determining objects that reside within the specific area.

* * * * *